Patented Dec. 7, 1937

2,101,215

UNITED STATES PATENT OFFICE 2,101,215

RESINOUS AMINOMETHANOL-AROMATIC AMINE-FORMALDEHYDE CONDENSATION PRODUCTS

George D. Graves and Jesse Harmon, Wilmington, Del., assignors to E. I. du Pont de Nemours & Company, Wilmington, Del., a corporation of Delaware No Drawing. Application November 25, 1936, Serial No. 112,826

10 Claims. (Cl. 260—130)

This invention relates to new synthetic resins, and more particularly to synthetic resins which are readily soluble in dilute aqueous acids and are obtained by reacting formaldehyde with selected types of amines.

Aromatic amine-aldehyde resins, such as aniline-formaldehyde resins, are well known. These resins, however, are of limited utility in the arts because they are either insoluble or soluble only to a slight degree in dilute aqueous acids. U. S. Patent 1,939,691 and its various equivalents are representative of the present state of the art. British Patent 371,481 is also illustrative.

This invention has as an object the provision of a process for making resins of the amine-aldehyde type which are practically soluble in dilute aqueous acids, particularly acetic acid. A further object is the class of resins so prepared.

The above and other objects appearing hereinafter are accomplished by the following invention wherein an aliphatic amine having at least one amino-hydrogen atom and in which each radical attached to amino-nitrogen has less than seven carbon atoms, a primary aromatic amine in amount less than about 2.2 mols per mol. of aliphatic amine, and formaldehyde in excess of one mol. per mol. of combined amines, are reacted in a suitable liquid medium at a temperature which is initially less than 10° C. and finally about 55–75° C. for at least ten hours, the product cooled and a hydrohalide added, the resulting mixture heated to resinification and the resin isolated. Resins obtained in this way are heat-hardening to a greater or less degree, are soluble to the extent of at least one gram in 99 grams of 2% aqueous acetic acid as well as in many other aqueous organic or mineral acids of various strengths, and are insoluble in water, aqueous alkalies and other bases.

It will be noted that the aliphatic amine may be primary or secondary, but not tertiary. If primary, the alkyl or substituted alkyl radical attached to the NH2 group should have less than seven carbons; if secondary, both alkyl or substituted alkyl radicals attached to the NH group may have up to and including six carbons. The aromatic amine can be primary only, aniline being typical. The liquid medium, as may be deduced from the character of the reactants, should generally comprise a water-soluble organic solvent which is non-reactive toward formaldehyde and amines. The more detailed practice of the invention resolves itself into three more or less distinct steps, as follows:

1. Formation of aminomethanols. The properly chosen mixture or amines is dissolved or dispersed in a suitable liquid medium, and the resulting solution is cooled to below 10° C. A molecular excess of formaldehyde (i. e., more than one mol. of formaldehyde per mol. of combined amines) is then added with stirring, the temperature of the mixture preferably being maintained at about 10° C. Maintenance of a low temperature prevents the reaction of formaldehyde with the aromatic amine and permits the formation of aminomethanols from the aliphatic amine and part of the formaldehyde. The reactions are probably as follows, Equations I and II representing the combination of a primary amine with different proportions of formaldehyde, and Equation III representing the reaction of a secondary amine with formaldehyde:

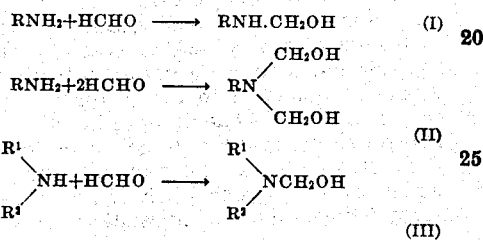

In the above equations, R, $R^1$ and $R^2$ represent alky or substituted alkyl radicals.

2. Condensation of the aminomethanol with the aromatic amine. After all of the formaldehyde has been added in Step 1, the well-stirred reaction mixture is heated at temperatures of about 55 to 75° C. for 10 to 48 hours, preferably at about 70° C. for about 24 hours. A small amount of catalyst for the reaction between the aminomethanol and the aromatic amine, such as phthalic anhydride, may be included although such catalyst is not essential. It is believed that the aminomethanol formed in Step 1 condenses with the aromatic amine to form substantially unpolymerized derivatives, probably according to the following equation:

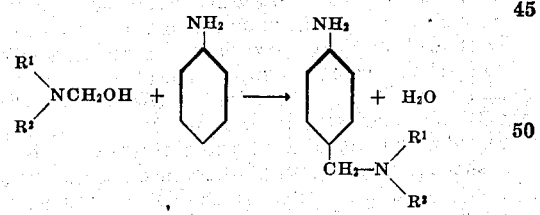

3. Condensation of the product of Step 2 with formaldehyde. The reaction mixture of Step 2 is cooled to 20-30° C.; concentrated hydrochloric acid in an amount approximately stoichiometrically equivalent to the aliphatic and aromatic amines originally present is added thereto; and the mixture is again heated with stirring at approximately the same temperature (about 55-75° C.) for about four hours or until a resinous product precipitates from a test portion of the reaction mixture upon adding aqueous caustic. The main portion of the reaction mixture is then cooled, diluted with water, and treated with sufficient aqueous caustic to precipitate the resin, which is finally washed with water and dried.

In the absence of a catalyst, the products of Step 2 do not condense with formaldehyde to any substantial degree, even when heated at temperatures up to 85° C. However, in the presence of aqueous hydrochloric or other strong mineral acid, such condensation occurs readily, the net result being that a number of aromatic nuclei are linked together in essentially the same manner as in the aniline-formaldehyde type of condensation product. The following, in which $x$ is a large indefinite number, are the probable reactions:

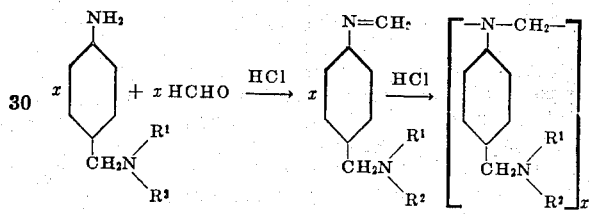

The reactants may be combined in any other suitable manner, so long as the sequence is (1) formation of the aminomethanol, (2) condensation of the aminomethanol with the aromatic amine, (3) condensation of the reaction product of Step 2 with formaldehyde. For example, the aliphatic amine may be added to a solution of formaldehyde at 0-30° C. (Step 1), the resulting solution then being heated with the aromatic amine at about 55 to 75° C. for about 10 to 48 hours (Step 2). The product is then cooled and subsequently heated with hydrochloric acid (Step 3). Or, in Step 1, the aliphatic amine may be added to a well-cooled solution or suspension of formaldehyde and the aromatic amine in a suitable solvent or reaction medium, and the resulting reaction mixture subsequently treated as already described for Steps 2 and 3. Still another way of bringing about the desired reaction is to form the desired aminomethanol by condensing stoichiometrical proportions of formaldehyde and the aliphatic amine at 0-30° C., then reacting the aminomethanol with the aromatic amine, and finally reacting the product of the last step with formaldehyde in slight excess of the amount required to carry out Step 3. Still other modifications of the process will occur to those who are skilled in the art.

It is important that the reactions be carried out in the sequence indicated. If the hydrochloric acid is added in Step 2, resins less soluble in dilute acids are obtained, since the acid not only decomposes more or less of the aminomethanol and therefore prevents it from condensing with the aromatic amine, but also prematurely catalyzes the condensation of the formaldehyde with the aromatic amines so that products resembling the usual aromatic amine-formaldehyde resins result possessing a decreased ability to dissolve in dilute acids. If the temperature is allowed to rise above about 75° C. in Step 2, the aminomethanol may decompose, and upon addition of hydrochloric acid in Step 3, resins of the aromatic amine-formaldehyde type result.

Primary aromatic amines, i. e. amines containing one or more amino- (NH$_2$) groups directly attached to an aromatic nucleus such as phenyl, naphthyl, etc., which nucleus is free from acidic or negative groups (such as carboxyl, nitro, halogen, sulfo, aldehyde or phenolic hydroxyl groups) may be employed. The nuclei may have alkyl, hydroxyalkyl, or aryl substituents. Suitable primary aromatic amines include therefore aniline, toluidine, xylidines, alpha-naphthylamine, beta-naphthylamine, phenylene-diamines, p-hydroxymethylaniline, benzidine, and other amino-diphenyls. Mononuclear primary aromatic amines of the formula RNH$_2$ wherein R is a mononuclear aromatic hydrocarbon radical represent an especially preferred class because of their availability, reactivity and freedom from complication in reaction and product.

As already pointed out, the aliphatic amines suited for use in the present invention can be primary and secondary only. The radical or radicals attached to amino nitrogen can be aliphatic only, and must have less than seven carbon atoms. The suitable aliphatic amines may be expressed comprehensively by the general formula $R^1NHR^2$, where $R^1$ is hydrogen, alkyl, aminoalkyl, thioalkyl, or hydroxyalkyl, and $R^2$ is alkyl, aminoalkyl, hydroxyalkyl, or thioalkyl. $R^2$ should have less than seven carbon atoms, as should $R^1$ if not hydrogen. Specific examples of the aliphatic amines which may be used in the invention are as follows: methyl-, dimethyl-, ethyl-, diethyl-, propyl-, isopropyl-, diisopropyl-, butyl-, isobutyl-, amyl-, diamyl-, hexyl- and cyclohexylamines; methylethylamine and ethylpropylamine; mono- and diethanolamine; ethylenediamine; and morpholine and piperidine.

Ordinary 37% aqueous formaldehyde is preferred for use in this invention but gaseous formaldehyde may be passed into the reaction mixture if desired, or paraformaldehyde or hexamethylenetetramine may be used in suspension or solution. Aqueous solutions of formaldehyde of other strengths may also be used.

Water-soluble, relatively volatile organic solvents which are non-reactive toward formaldehyde and amines are suitable as reaction media in this invention. Examples of such solvents are the common alcohols containing less than five carbon atoms, such as methyl, ethyl, propyl, and isopropyl; ether-alcohols such as beta-methoxyethanol, beta-ethoxyethanol, monoethylin, and other lower monoalkyl ethers of glycerol and ethylene glycol; ethers such as dioxane, and the dimethyl and diethyl ethers of ethylene glycol; and esters such as methyl acetate. Water alone may sometimes be employed when a satisfactory emulsion of the amines therein can be obtained.

The hydrogen chloride used as the condensing agent in Step 3 of the invention may be the gaseous product or it may be employed in aqueous solutions of a wide range of concentrations. The ordinary commercial 37% hydrochloric acid, however, is preferable. Other hydrohalides such as hydrogen bromide and iodide may be used instead of hydrogen chloride.

Having thus outlined in detail the principles and purposes of the invention the following exemplifications thereof wherein the parts are by weight are added in illustration and not limitation:

Example I

To a solution of 36.4 parts (0.4 mol.) of aniline and 14.6 parts (0.2 mol.) of n-butylamine in 170 parts of 95% ethanol, cooled to 4° C., are added 81 parts (1 mol.) of 37% aqueous formaldehyde. The solution is allowed to warm up to 25° C. during the course of about 5 hours and then 1 part of phthalic anhydride is added. The mixture is next heated at 65-75° C. for about 24 hours, but no resin forms. It is then cooled to room temperature and 60 parts of 37% hydrochloric acid (0.6 mol.) is added with stirring at 20-30° C. The resulting mixture is heated at 65-75° C. for four hours. To it is then added 500 parts of water, followed by an excess of 5% aqueous caustic soda, which is added slowly with stirring. An almost white precipitate forms which is filtered, washed well with water, and dried. A yield of 60 parts is obtained. This resin is soluble in dioxane and chloroform but insoluble in ethanol, acetone, toluene, ethyl acetate, and gasoline. Three parts of the resin dissolves readily in 97 parts of 2% aqueous acetic acid at room temperature.

Example II

Two-tenths of a mol. of p-toluidine is substituted for the aniline of Example I and the same procedure is carried out. A resin having substantially the same properties as that described in Example I is obtained.

Example III

Di-n-propylamine is used instead of n-butylamine in Example I. A substantially white, resinous product is obtained, soluble in cold 2% acetic acid.

Example IV m-Phenylenediamine is substituted for the aniline in Example I. The resinous reaction product is of the same order of solubility in 2% aqueous acetic acid as the resin of Example I.

Example V

Dimethylamine is substituted for the butylamine of Example I, 0.2 mol. thereof being passed in gaseous form into 81 parts (1 mol.) of 37% aqueous formaldehyde at about 10° C. The resulting dimethylamine methanol solution is then added to a similarly cooled solution of 0.4 mol. of aniline in 170 parts of 95% ethanol, and the subsequent reaction carried out as in Example I. A white resinous reaction product readily soluble in 2% aqueous acetic acid is obtained.

The molal ratio of aromatic to aliphatic amine should be less than about 2.2 to 1, but preferably not less 1 to 1. If it equals or exceeds the 2.2 to 1 ratio, resins insoluble in dilute aqueous acids, or of inferior acid-solubility, result. This molal ratio may, if desired, be less than 1 to 1, but there is generally no increased acid-solubility attendant upon such proportions, hence no particular advantage to be gained. When the ratio of carbon atoms to amino nitrogen in the aromatic amine is greater than about 6 to 1, somewhat larger proportions of aliphatic amine may be required to secure resins of satisfactory acid solubility.

The proportions of formaldehyde to be employed should be greater than one mol. per mol. of combined aliphatic and aromatic amines, i. e., the number of mols of formaldehyde to be employed should be greater than the number of mols of the aromatic amine plus the number of mols of the aliphatic amine. The amount of formaldehyde used over these proportions may be varied as desired.

The phthalic anhydride is used in the invention in catalytic proportions only and may even be dispensed with altogether. It is preferably used in proportions of 0.5-5% by weight of the combined amines.

As already mentioned, the reaction temperatures in Steps 1 and 2 should be less than about 10° C. and in the range of about 55 to 75° C., respectively, but in Step 3, any convenient temperature ordinarily used in making aromatic amine-formaldehyde resins may be employed. However, unnecessarily high temperatures, for example above about 115° C., are to be avoided since they tend to cause the formation of products less soluble in dilute acids. In no stage of the invention is it necessary to heat the reaction mixtures above about 90 to 95° C.

Mixtures of two or more aliphatic and aromatic amines may be used in this invention. For example, one aliphatic amine may be used with two or more aromatic amines, or one aromatic amine may be used with two or more aliphatic amines. Part of the aromatic amine may be replaced with other substances which condense with formaldehyde, e. g., urea, to form new resins with modified properties. Any of the reactions can, if desired, be conducted under pressure.

It is to be understood that this invention is not limited in any way by any explanation or theory which has been given as to the probable reactions and products.

The resins described herein may be used as coating compositions which may range in character from simple solutions of the amino-resin in an organic solvent or an aqueous acid to compositions which contain only a small amount of amino resin or salt thereof. Typical of the latter are coating compositions in which the amino resin is present as a dispersing and/or emulsifying agent, such as (a) aqueous emulsions of materials liquid under conditions of emulsification such as oils and waxes, (b) aqueous dispersions of materials solid under the conditions of dispersion, (c) compositions containing both liquid and solids. It will be understood that specific resins will be particularly well suited for specific applications, and that the aforesaid compositions may contain, when desirable, appropriate auxiliary agents such as mold or mildew inhibitors, wetting agents, antioxidants, plasticizers, insecticides, adhesives, other film-forming materials, thickeners, and the like.

Compositions containing the present aminoresins are valuable for all varieties of coating, the latter word being used in its broadest sense to mean applications, not only to impervious surfaces such as metal, but also to porous or fibrous bodies such as wood, brick, plaster, paper, paper pulp, asbestos, silk, cotton, wool, regenerated cellulose, etc., and articles of manufacture therefrom, such as textiles. The above coating compositions also have valuable adhesive properties and the various coated materials just mentioned may be readily glued to themselves or to one another, usually with application of heat.

Specific uses for which these coating compositions are suitable are as follows: (1) as sizes for rayon tire cord, to improve its adhesion to rubber; (2) as sizes for transparent sheets of regenerated cellulose, to improve the anchorage thereto of printing inks and lacquers; (3) as water-proof glues in the manufacture of veneers (i. e., for gluing wood to wood); (4) as sizes and waterproofers for textiles; (5) as fixatives for acid dyes to paper; (6) as a beater size in the manufacture of chalk-filled paper; (7) and as agents for sizing and delustering fabrics and for affixing water-insoluble solids thereto. For (1), (2), and (3) it is preferable to use a solution of the amino-resin in a volatile aqueous acid; for (4) and (5) an aqueous emulsion of wax such as a paraffin and a fixing agent such as aluminum acetate, the amino resin being present as an emulsifying agent; for (6) the same type of emulsions as for (5), except that the fixing agent is optional; and for (7), an aqueous dispersion of titanium oxide and/or other finely divided water-insoluble solid (which may be a mildew preventive such as salicylanilide), a wetting agent, and a softener, the amino-resin being present as a dispersing agent. The present amino-resins are also useful as stabilizers for acid-yielding bodies such as chlorine-containing solvents, plasticizers, resins, and rubbers, and for improving the affinity of textiles and other cellulosic materials for acid and direct dyes.

The resins have been found particularly useful as anchor sizes for fixing pigments to rayon and paper, as adhesives for wood-to-wood joints, and as primers for wood paints. They have been found to be good anchoring agents for fixing titanium dioxide to rayon, and good adhesives for wood-to-wood joints which are to be exposed to moisture.

The present invention provides a method for synthesizing new, cheap and useful heat-hardening amino-resins which are soluble in dilute acids. These resins have much greater solubility in dilute acids than do the amine-aldehyde resins known in the prior art. We have found, for example, that a typical aniline-formaldehyde resin (prepared according to the procedure of Brit. 371,481) cannot be dissolved in dilute aqueous acetic acid and can be dissolved in glacial acetic acid only with great difficulty. The ready solubility of the resins described herein in dilute aqueous solutions of volatile acids such as acetic acid is a valuable property because in such solutions the resins can be used for many purposes for which acid-insoluble resins are less applicable. Dilute aqueous acids, moreover, are cheaper and less hazardous than many of the organic substances ordinarily used as solvents for resins.

The above description and examples are intended to be illustrative only. Any modification of or variation therefrom which conforms to the spirit of the invention is intended to be included within the scope of the claims.

We claim:

1. Process of preparing resins soluble at least to the extent of 1 part in 99 parts of 2% aqueous acetic acid which comprises the following steps: adding 81 parts of 37% aqueous formaldehyde to a solution, cooled to 4° C., of 36.4 parts of aniline and 14.6 parts of n-butylamine in 170 parts of 95% ethanol; adding 1 part of phthalic anhydride; heating the mixture for about 24 hours at 65–75° C.; cooling and then adding 60 parts of 37% hydrochloric acid while maintaining the temperature at 20 to 30° C.; heating the mixture at 65 to 75° C. for four hours; diluting with 500 parts of water; adding with agitation an excess of 5% aqueous caustic soda; filtering off the precipitate, washing and drying.

2. Process of preparing resins soluble at least to the extent of 1 part in 99 parts of 2% aqueous acetic acid which comprises adding aqueous formaldehyde in molecular excess of all amines present to an ethanol solution maintained below 10° C., of n-butylamine and up to 2.2 mols of aniline per mol. of n-butylamine, adding a catalytic amount of phthalic anhydride, heating the mixture at a temperature of 55 to 75° C. for at least ten hours, adding concentrated hydrochloric acid at 20 to 30° C. in an amount stoichiometrically equivalent to the amines, thereafter heating the mixture with agitation at a temperature of 55 to 75° C. until a resinous product is precipitated upon addition of caustic soda to the mixture, and isolating the resulting resinous product.

3. Process of preparing resins soluble at least to the extent of 1 part in 99 parts of 2% aqueous acetic acid which comprises adding aqueous formaldehyde in molecular excess of all amines present to a solution (maintained below 10° C.), in a water-soluble volatile organic solvent non-reactive toward formaldehyde and amines, of an aliphatic amine having at least one amino-hydrogen atom and in which each radical attached to amino-nitrogen has less than seven carbon atoms, and up to 2.2 mols, per mol. of aliphatic amine, of a primary aromatic mononuclear amine wherein the amino group is attached to a hydrocarbon radical, heating the mixture at a temperature of about 55 to 75° C. for at least ten hours, adding concentrated hydrochloric acid at 20 to 30° C. in an amount at least stoichiometrically equivalent to the amines, thereafter heating the mixture with agitation at a temperature of about 55 to 75° C. until a resinous product is precipitated upon addition of caustic soda to the mixture, and isolating the resulting resinous product.

4. Process of preparing resins soluble at least to the extent of 1 part in 99 parts of 2% aqueous acetic acid which comprises forming an aminomethanol by condensing, at a temperature below 10° C., formaldehyde with an aliphatic amine having at least one amino-hydrogen atom and in which each radical attached to amino-nitrogen has less than seven carbons; condensing said aminomethanol at about 55 to 75° C. with a primary aromatic mononuclear amine wherein the amino group is attached to a hydrocarbon radical; condensing the resulting aminomethanol-aromatic amine condensation product, at about 55 to 75° C., with formaldehyde in molecular excess of the aromatic amine until a resinous product precipitates when the reaction mixture is made neutral with caustic soda.

5. Process of preparing resins soluble at least to the extent of 1 part in 99 parts of 2% aqueous acetic acid which comprises forming an aminomethanol from formaldehyde and an aliphatic amine having at least one amino-hydrogen atom and in which each radical attached to aminonitrogen has less than seven carbon atoms, condensing the aminomethanol with a primary aromatic amine, wherein the amino group is attached to a hydrocarbon radical, condensing the resulting aromatic amine-aminomethanol reaction product with formaldehyde, and isolating the resin thereby obtained.

6. A heat-hardening resin soluble to the extent of at least one gram in 99 grams of 2% aqueous acetic acid and insoluble in water and basic solutions, said resin being a condensation product of formaldehyde with a condensation product of a primary aromatic amine R—NH$_2$, wherein R is hydrocarbon, with an aminomethanol from formaldehyde and an aliphatic amine having at least one amino hydrogen atom and in which each radical attached to the amino nitrogen atom has less than seven carbon atoms.

7. A resin obtainable by the process of claim 5.

8. A resin obtainable by the process of claim 4.
9. A resin obtainable by the process of claim 3.
10. The resin obtainable by the process of claim 2.

GEORGE D. GRAVES.
JESSE HARMON.